Patented Mar. 31, 1925.

1,531,925

UNITED STATES PATENT OFFICE.

LOUIS HAAS, OF PARIS, FRANCE, ASSIGNOR TO THE SOCIÉTÉ CHIMIQUE DE LA GRANDE PAROISSE, OF PARIS, FRANCE.

BROWN SULPHUR DYESTUFFS.

No Drawing.   Application filed September 2, 1921.   Serial No. 498,087.

*To all whom it may concern:*

Be it known that I, LOUIS HAAS, of Paris, France, have invented Brown Sulphur Dyestuffs, of which the following is a full, clear, and exact description.

As is well known, the dinitronaphthalene obtained by the direct nitration of naphthalene, is a mixture of two isomers. The successive treatment of these products with sulphuric acid and with dilute nitric acid transforms them into trinitronaphthols 1:2:4:8 and 1:2:4:5.

The object of the present invention is a process for transforming these trinitronaphthols into brown sulphur dyestuffs with a reddish tinge.

In principle, this process consists in treating the said products with alkali metal polysulphides.

By way of example, the present process can be carried out by the following method of working:

Ten kilogrammes of one or other of these trinitronaphthols are incorporated into a fused mixture of 40 kilogrammes of crystallized sodium sulphide, 4 kilogrammes of sulphur and 8 litres of water, the whole being heated to a temperature in the neighbourhood of 150 deg. C. A considerable liberation of ammonia results, and the mass thickens. The temperature is then raised to about 170 deg. C. Sulphuretted hydrogen is given off, and the heating is continued until this liberation ceases altogether. The product is then dissolved in 300 litres of water, and the dyestuff is precipitated with an acid.

Trinitronaphthol 1:2:4:8 furnishes a brown dyestuff having a more decided reddish tinge than that from the isomer 1:2:4:5. Both will dye cotton in a sodium sulphide bath. The dyeings obtained with these dyestuffs are fast to light and do not bleed into the white.

It will be understood that the present process could also be carried out by sulphurizing a mixture of these trinitronaphthols in the same way. All that is necessary to replace the trinitronaphthols 1:2:4:8 and 1:2:4:5 of the above example by a mixture (equi-molecular or otherwise) of these products, according to the shade of colour desired.

The above proportions are given merely by way of example and may be modified according to the shades desired.

Claims—

1. A process for the manufacture of brown coloring products having a red tinge consisting in treating crude trinitronaphthol with a polysulphide of an alkali metal.

2. A process for the manufacture of brown coloring products having a red tinge consisting in treating trinitronaphthol 1:2:4:8 with a sulphide of an alkali metal.

3. A process for producing brown dyestuff with a reddish tinge which comprises heating trinitronaphthol 1:2:4:8 with a solution of a polysulphide of an alkali metal.

4. A process for producing brown dyestuffs with a reddish tinge which comprises heating trinitronaphthol with a solution of a polysulphide of an alkali metal until the water has evaporated and then raising the temperature to approximately 170° for driving off the hydrogen sulphide.

5. A process for producing brown dyestuffs with a reddish tinge which comprises heating trinitronaphthol in a solution formed from a fused mixture of sodium sulphide, sulphur and water, and then raising the temperature to approximately 170° for liberating hydrogen sulphide.

6. A coloring product derived from crude trinitronaphthol having the characteristics of coloring vegetable fibers brown with a reddish tinge when dipped in sodium sulphide.

The foregoing specification of my improved brown dyestuffs signed by me this 13th day of August 1921.

LOUIS HAAS.